United States Patent [19]

Dobrowsky

[11] Patent Number: 4,882,104
[45] Date of Patent: Nov. 21, 1989

[54] METHOD OF CONTROLLING THE THICKNESS OF AN EXTRUDED PLASTIC ARTICLE

[75] Inventor: Josef Dobrowsky, Tullnerbach, Austria

[73] Assignee: Cincinnati Milacron, Inc., Cincinnati, Ohio

[21] Appl. No.: 173,933

[22] Filed: Mar. 28, 1988

[30] Foreign Application Priority Data

Apr. 3, 1987 [AT] Austria ................... 818/87

[51] Int. Cl.⁴ ............................................. B29C 47/92
[52] U.S. Cl. ................... 264/40.1; 264/40.2; 264/40.6; 264/40.7; 264/209.1; 364/473; 364/563; 425/141; 425/144
[58] Field of Search ................... 264/40.1, 40.2, 40.6, 264/40.7, 209.1, 211.21, 211.23; 425/141, 143, 144; 364/473, 476, 557, 563

[56] References Cited

U.S. PATENT DOCUMENTS

| | | |
|---|---|---|
| Re. 29,886 | 1/1979 | Dembiak et al. ............ 264/40.7 X |
| 3,212,127 | 10/1965 | Flook, Jr. et al. ............... 425/141 |
| 3,474,160 | 10/1969 | Doering ........................... 264/40.1 |
| 3,761,553 | 9/1973 | Richardson ..................... 425/141 X |
| 3,883,279 | 5/1975 | Heyer ................................. 425/141 |
| 3,974,248 | 8/1976 | Atkinson ........................... 264/40.2 |
| 4,000,402 | 12/1976 | Higham ......................... 425/141 X |
| 4,027,527 | 6/1977 | Bennett et al. ................. 364/563 X |
| 4,137,025 | 1/1979 | Graves et al. ................. 425/141 X |
| 4,137,028 | 1/1979 | Reitemeyer et al. ............... 425/141 |
| 4,152,380 | 5/1979 | Graves et al. ................. 264/40.1 X |
| 4,339,403 | 7/1982 | Upmeier et al. .................. 264/40.1 |
| 4,339,404 | 7/1982 | Upmeier et al. .................. 264/40.1 |
| 4,425,289 | 1/1984 | Lee et al. ........................... 264/40.1 |
| 4,425,290 | 1/1984 | Upmeier ............................ 264/40.1 |
| 4,426,239 | 1/1984 | Upmeier ........................ 264/40.1 X |
| 4,464,318 | 8/1984 | Upmeier et al. .................. 264/40.1 |
| 4,480,981 | 11/1984 | Togawa et al. .................... 425/143 |
| 4,512,943 | 4/1985 | Hahn et al. ................... 264/40.6 X |
| 4,520,672 | 6/1985 | Saint-Amour ............... 264/40.1 X |
| 4,548,570 | 10/1985 | Hahn et al. ........................ 425/141 |
| 4,551,289 | 11/1985 | Schwab et al. ............... 264/40.1 X |
| 4,711,747 | 12/1987 | Halter ................................ 264/40.2 |
| 4,719,808 | 1/1988 | Baumann et al. ............ 264/40.1 X |
| 4,740,146 | 4/1988 | Angelbeck ..................... 425/141 X |
| 4,749,531 | 6/1988 | Börger et al. ..................... 264/40.6 |

FOREIGN PATENT DOCUMENTS

| | | |
|---|---|---|
| 180571 | 5/1986 | European Pat. Off. . |
| 1957078 | 5/1971 | Fed. Rep. of Germany . |
| 1504253 | 2/1972 | Fed. Rep. of Germany . |
| 2223609 | 11/1972 | Fed. Rep. of Germany . |
| 2234876 | 1/1973 | Fed. Rep. of Germany ...... 425/144 |
| 2232930 | 2/1973 | Fed. Rep. of Germany . |
| 2542331 | 9/1976 | Fed. Rep. of Germany ...... 425/141 |
| 3107701 | 1/1982 | Fed. Rep. of Germany . |
| 3306533 | 8/1984 | Fed. Rep. of Germany ...... 364/476 |
| 1467944 | 2/1967 | France . |
| 1492742 | 8/1967 | France . |
| 2148518 | 3/1973 | France . |
| 2157051 | 6/1973 | France . |
| 2221264 | 10/1974 | France . |
| 1372074 | 10/1974 | United Kingdom . |

Primary Examiner—Jeffery Thurlow
Assistant Examiner—Leo B. Tentoni
Attorney, Agent, or Firm—Laurence R. Brown; Alfred J. Mangels

[57] ABSTRACT

A method for monitoring and controlling the wall thickness of an extruded profile of heated polymeric material that issues from an extrusion die. The die includes a plurality of discrete sectors each having a controllable heat source and a temperature sensor, and the temperature at each particular sector is controlled and adjusted in order to change the measured wall thickness corresponding with that particular sector as necessary to provide a desired wall thickness distribution. A characteristic curve for the particular material is provided as an input quantity and involves the relationship between a change in extrusion temperature versus the corresponding change in wall thickness, and that relationship is utilized to effect rapid adjustment of wall thickness by means of a temperature change in order to provide a finished article having the desired thickness profile and without having excessive material, to thereby reduce the weight and cost of the extruded article.

11 Claims, 5 Drawing Sheets

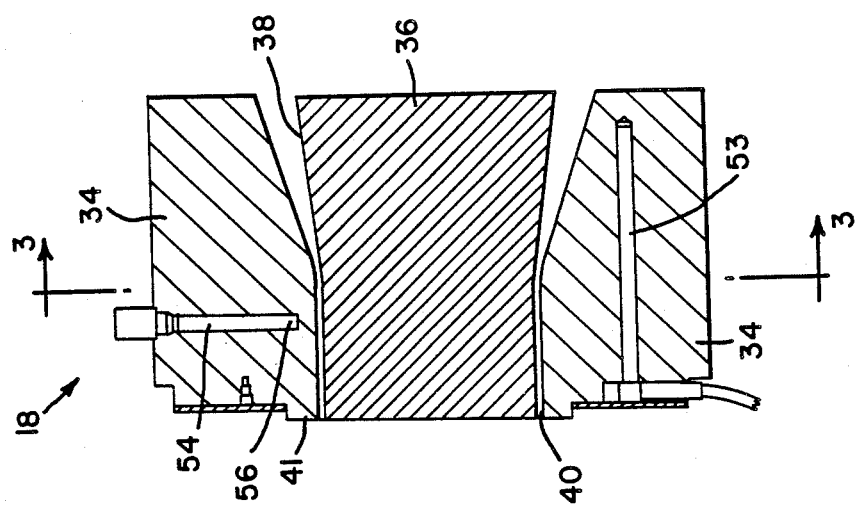
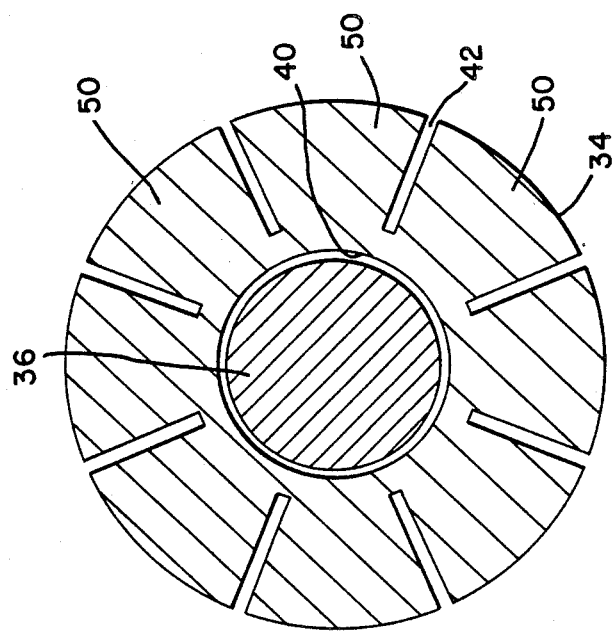

METHOD OF CONTROLLING THE THICKNESS OF AN EXTRUDED PLASTIC ARTICLE

BACKGROUND OF THE INVENTION

1. Field of the Invention

This invention relates to the extrusion of plastic pipes and other profiles, and more particularly to a method of controlling a thickness dimension, such as wall thickness in a pipe profile, by measuring the thickness dimension and adjusting heating elements positioned at the die outlet in order to increase the temperature of the extruded material and thereby increase the thickness at a desired point on the article, and adjusting the heating elements in order to decrease the temperature and thereby decrease the thickness at a desired point on the article, to maintain a desired thickness profile in the extruded article.

2. Description of the Related Art

In the continuous extrusion of plastic profiles, such as pipes, the wall thickness of the extrusion can be controlled to a certain degree by raising or lowering the haul-off speed, whereby the extruded article is pulled away from the extrusion die after sufficient cooling has occurred to permit handling of the article without permanent deformation. That method of control affects the average thickness of the article, but it has no effect with regard to the correction of any eccentricity or non-uniformity that may exist in the thickness. In an extruded pipe such eccentricity would be manifested in an extruded pipe structure wherein certain circumferential portions of the pipe have different wall thicknesses from other circumferential portions.

In order to correct any eccentricity that may exist in an extruded pipe, the extrusion die must be reset in order to reposition the center mandrel with respect to the surrounding outer die structure in order to bring the axis of the mandrel into substantial concentricity with the surrounding outer die structure. To permit such repositioning, however, imposes significant structural complications upon the extrusion die structure, whether such correction is capable of being performed either manually or automatically, such as by means of motors or the like.

The control of the haul-off rate, in addition to affecting the average pipe wall thickness, is monitored principally to control the minimum wall thickness so that it falls within the prescribed wall thickness tolerance. However, when controlling the extrusion process by that method, unnecessary and excessive material can be extruded if the inner and outer die faces are not concentric. Thus, in order to meet the minimum wall thickness standard, excessively thick portions of material exist at other parts of the pipe cross section, which unnecessarily increases the material costs for producing such pipes.

In connection with the mechanical centering of the parts of the extrusion die to improve concentricity, that particular process is cumbersome, often imprecise, and the use of motors and other automatic equipment introduces unnecessary complexity to the die structure, which results in increased die costs, as well as increased die maintenance resulting from wear of the moving parts, breakage of parts, and the like. One example of apparatus that has been devised to permit centering of a core with respect to an extruder head is illustrated and described in U.S. Pat. No. Re. 29,886, which issued Jan. 16, 1979, to Matthew R. Dembiak et al.

One form of apparatus for controlling the wall thickness of a pipe by controlling the haul-off speed is illustrated and described in U.S. Pat. No. 4,137,025, which issued Jan. 30, 1979, to Kenneth E. Graves et al.

It is an object of the present invention to overcome the shortcomings of the prior art devices and methods, and to provide a simple and efficient method of controlling the wall thickness distribution of an extruded article in order to maintain a desired thickness profile and without the need for mechanical shifting of parts of the extrusion die.

SUMMARY OF THE INVENTION

Briefly stated, in accordance with one aspect of the present invention, a method is provided for monitoring and controlling the wall thickness of an extruded profile of heated polymeric material that issues from an extrusion die. The die includes a plurality of discrete sectors each having a controllable heat source and a temperature sensing means. The heated material is forced through the extrusion die to extrude an article of predetermined cross-sectional shape from the die. The article has a periphery and a longitudinal axis extending in the extrusion direction, and the thickness of the extruded article is measured at a plurality of spaced measuring points on the periphery of the article, each of the measuring points spaced from each other relative to the longitudinal axis of the article. A predetermined desired average article thickness, as well as a predetermined article thickness distribution and a predeterined thickness tolerance are selected. The relationship between change in temperature at the extrusion die and resulting change in wall thickness is provided in order to permit a determination to be made of a necessary temperature change to effect a desired thickness change. The average overall thickness of the extruded article is determined from the several thicknesses at the respective thickness measuring points, as is the maximum thickness of the extruded article and the position on the article corresponding with the maximum thickness, and the minimum thickness of the extruded article and the position on the article corresponding with the minimum thickness. The temperature changes required at each sector of the die to change the measured thickness to corrrespond substantially with the desired thickness are determined, and the temperatures of respective individual heat sources at the respective extrusion die sectors are changed in order to provide the desired thickness distribution for the extruded article.

BRIEF DESCRIPTION OF THE DRAWINGS

FIG. 2a is a fragmentary cross-sectional view of the extrusion die showing the general configuration of the flow channel for the plastic material as well as a heat source and a temperature sensor positioned within the die structure.

FIG. 2b is an end view at the die outlet for the extrusion die illustrated in FIG. 2a.

DESCRIPTION OF THE PREFERRED EMBODIMENTS

Figure 1:
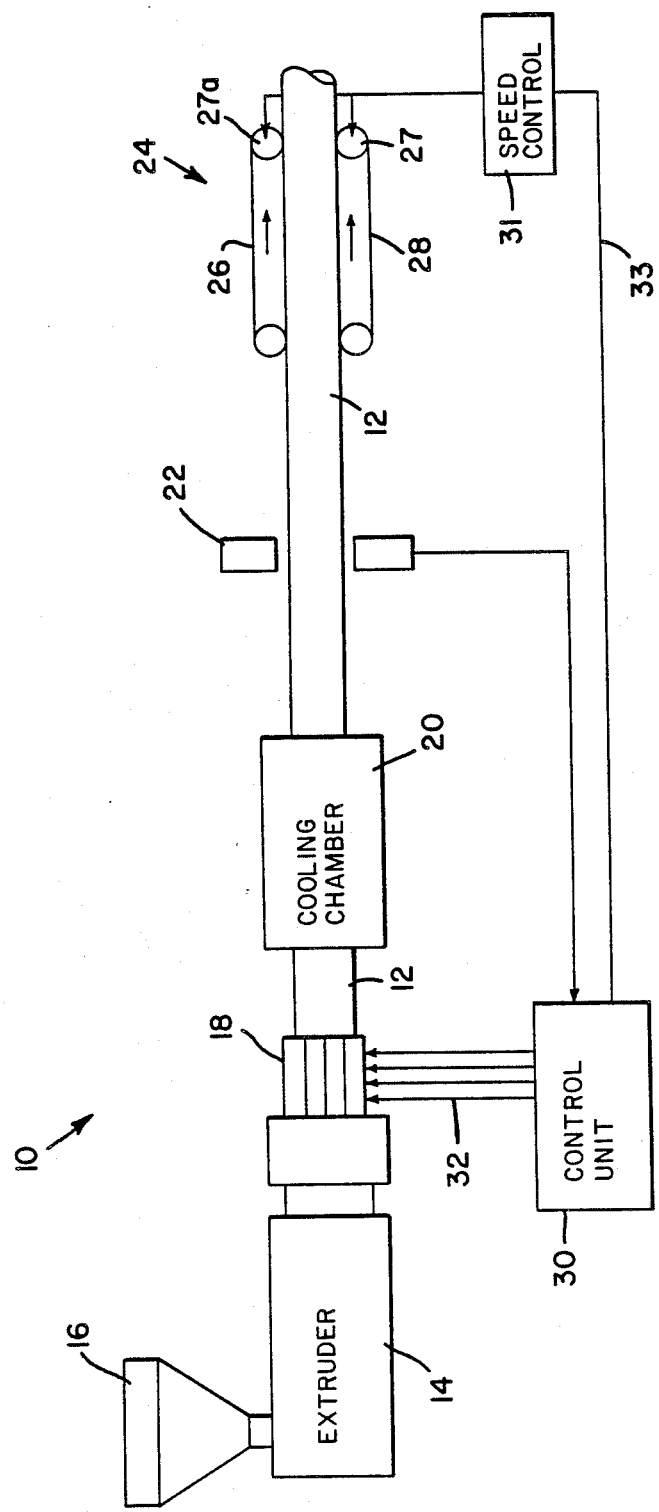
FIG. 1 is a schematic view of an extrusion line for producing an extruded article by extruding heated plastic material through an extrusion die.

Referring now to the drawings, and particularly to FIG. 1 thereof, there is shown a portion of an extrusion production line 10 for continuously forming an extruded article 12. The ensuing discussion will be based upon the extruded article being a pipe having a circular inner diameter, a circular outer diameter, and a uniform wall thickness determined by the differences between the inner and outer diameters at respective spaced circumferential points around the periphery of the pipe. However, it will be appreciated by those skilled in the art that the apparatus and method herein disclosed can also be applied to the extrusion of other extruded shapes and profiles, and the description herein of the process and apparatus in terms of a pipe is merely illustrative of the present invention.

The production line includes an extruder 14, which can be of any desired type, such as, for example, a single screw extruder having one screw rotatably carried within an externally heated tubular barrel, or a twin screw extruder having a pair of screws rotatably carried within an externally heated tubular barrel and having a single outlet for the extruded material. Such a twin screw extruder can be either one having intermeshing screws with the screw axes disposed in parallel relationship, or it can be one having conical-shaped intermeshing screws with their axes intersecting.

Extruder 14 includes a hopper 16 into which solid pellets of the polymeric material are introduced. The rate of introduction of the polymeric material can be controlled by suitable quantity metering systems, as will be appreciated by those skilled in the art. Hopper 16 is positioned at the upstream end of extruder 14 and the polymeric material passes into the interior of the extruder barrel and is carried along the extruder axis by means of the conveying action of the extruder screw flights (not shown), which carry the material toward an extrusion die 18 positioned at the downstream outlet of the barrel. During the time the polymeric material is within the barrel of the extruder it is softened by heat and mechanical working so that the pellets melt to form a continuous, viscous, coherent mass.

Extrusion die 18 has a cross-sectional shape and area corresponding with that of the desired extruded article. As mentioned earlier, the discussion herein will be in the context of a pipe as the extruded article, and therefore the extrusion die will include an outer ring and an inner mandrel to define an annular flow channel through which the polymeric material passes after it has been plasticated. After the plasticated material issues from extrusion die 18, the hot, tubular extrusion passes through a cooling chamber 20 where the temperature of the material is reduced, such as by a spray of cooling water, or the like, to reduce the temperature of the material to at least partially solidify it so that the resulting tubular pipe can be handled without deforming it, and so that the pipe maintains its circular inner and outer walls and does not become deformed into an elliptical or other non-circular shape.

Downstream of cooling chamber 20 is a wall thickness measurement device 22, the purpose of which is to measure the thickness of the cooled pipe at various circumferential positions downstream of cooling chamber 20. Wall thickness measuring device 22 can be of any of a number of different types, including, by way of example, a source of beta radiation positioned interiorly of the pipe and with external, circumferentially spaced ionization chambers, such as is illustrated in U.S. Pat. No. 4,137,028, which issued Jan. 30, 1979, to Paul Reitemeyer et al. Alternatively, the wall thickness measurement device can be an ultrasonic device, wherein a sensor sends ultrasonic waves through the pipe wall from the outside of the pipe and senses the echo of returning waves to provide an output signal proportional to the pipe wall thickness. An example of one form of ultrasonic wall thickness measurement device that is suitable in practicing the present invention is manufactured by Inoex Gmbh, Bad Oeynhausen, West Germany. Preferably, the thickness measurement device that is used provides an electrical signal proportional to the wall thickness for subsequent processing in a suitable control unit, as will be described hereinafter in more detail.

Downstream of wall thickness measurement device 22 is a hauloff device 24, which, as shown, can include a pair of endless belts 26, 28 that are driven in a common direction and that contact the pipe outer surface on opposite sides thereof in such a way as to draw it away from cooling chamber 20.

Although several components of a pipe production line have been illustrated and briefly described, it will be apparent to those skilled in the art that various other devices can also be provided if desired, such as vacuum sizing devices, pipe saws, and the like.

Extrusion line 10 as illustrated in FIG. 1 includes a control unit 30, which can include one or more microprocessors to control the operation of the line. Control unit 30 is adapted to receive as inputs the wall thickness signals that are outputs from wall thickness measurement device 22, as well as the corresponding positions at which the measurements are made around the pipe periphery. The wall thickness signals are utilized to monitor the wall thickness of the extruded pipe and the control unit processes the signals to provide control signals to influence wall thickness by adjusting extrusion die temperature, as will hereafter be described in more detail. Control unit 30 provides output signals over lines 32 to respective heating devices (not shown in FIG. 1) carried in extrusion die 18, and it also receives as further inputs temperature signals from temperature sensors that are also carried in the extrusion die.

In addition to controlling wall thickness by adjusting extrusion die temperatures, control unit 30 also controls the overall average wall thickness by controlling the speed of operation of haul-off device 24. In that connection, belts 26 and 28 can be driven by drive motors 27, 27a, respectively, the speed of each of which is controlled by a speed control 31 that receives a speed control signal from control unit 30 over line 33.

Referring now to FIGS. 2a, 2b, 3, and 4, each of which illustrates a structural portion of extrusion die 18, an outer sleeve 34 of generally annular cross section is provided, and an inner solid mandrel 36 is preferably coaxially positioned therein to define therewith an annular flow passageway 38 that terminates in an annular outlet opening 40 of predetermined size in order to provide a pipe having a desired predetermined cross section. Annular opening 40 is preferably of uniform size in a circumferential direction, which is achieved when the sleeve and mandrel are coaxial. Less than perfect coaxial alignment will result in some amount of eccentricity, to cause annular passageway 38, as well as annular outlet opening 40, to have a greater radial thickness at some points than at others.

Figure 4:
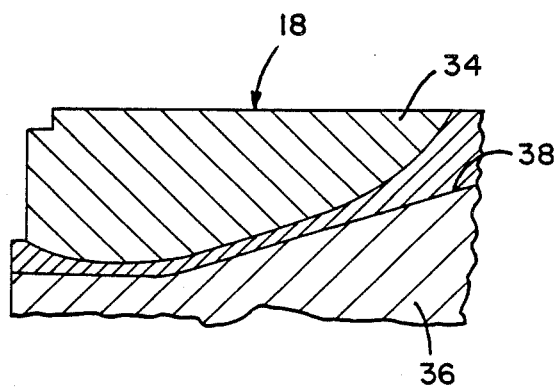
FIG. 4 is an enlarged fragmentary view of the flow channel in the extrusion die.

Looking upstream from outlet 40, and as best seen in FIGS. 2a and 4, annular passageway 38 diverges to connect with an extruder outlet (not shown).

Figure 3:
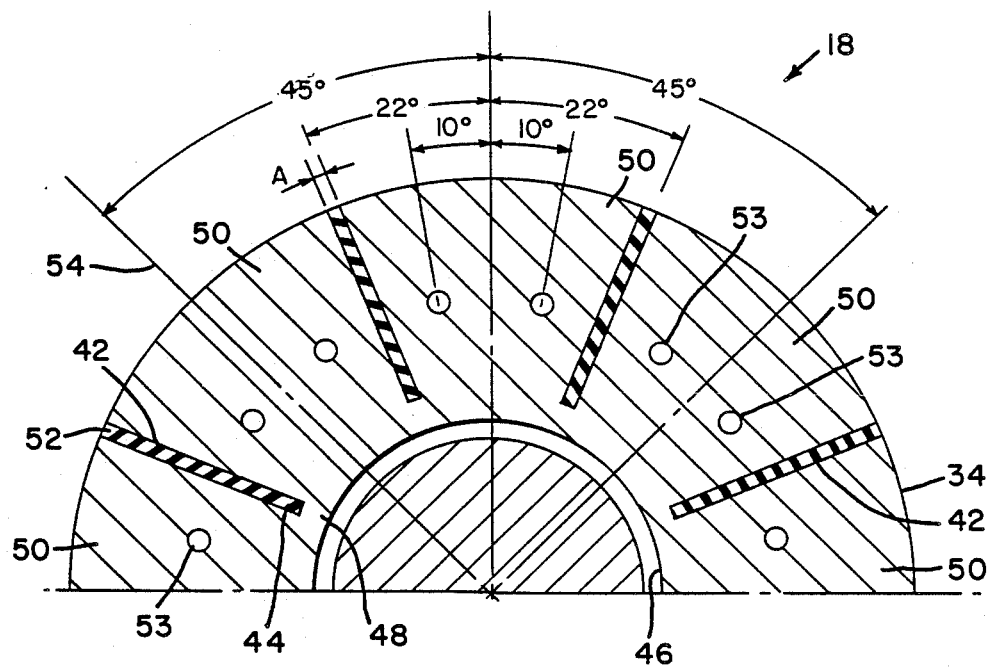
FIG. 3 is an enlarged fragmentary cross-sectional view of the die of FIG. 2a taken along the line 3—3 thereof.

Referring now to FIGS. 2b and 3, outer sleeve 34 includes a plurality of radially extending slots 42 that are equidistantly spaced about the periphery of the sleeve. Eight such slots are shown, to divide sleeve 34 into eight equal sectors. Slots 42 extend radially inwardly from the exterior of sleeve 34 to a point 44 just short of the inner diameter 46 of the sleeve, to define a web or connecting portion 48 between the resulting adjacent sectors 50 that are separated from each other by the respective radial slots 42. Preferably, radial slots 42 extend in an upstream direction from the end face 41 of extrusion die 18 for a substantial distance so that the sectors are substantially independent and discrete with respect to each other for some axial distance, and so that the temperatures of the respective sectors can be individually controlled and maintained. In that regard, it is preferable, although not absolutely essential, that insulation material 52 be placed in radial slots 42 to more positively separate adjacent sectors 50 from each other from a thermal standpoint.

Referring now to FIGS. 2a and 3, each sector 50 contains two heating elements 53 that are of elongated, tubular form and that extend in a direction substantially coaxial with the axis of extruder die 18. Heating elements 53 are preferably equally spaced with respect to the radial center plane 54 of each of the sectors. The heating elements can be electrical resistance heaters, or they can be bores formed in the respective sectors and through which temperature controlled fluids can be circulated to provide a desired temperature at the portion of inner diameter 46 adjacent each of sectors 50.

In addition to heating elements 53, each of sectors 50 also includes at least one temperature sensing element 54 (see FIG. 2a), each temperature sensing element 54 having a sensing tip 56 that is placed as closely as possible to the inner diameter 46 of outer sleeve 34 in order to measure the temperature at a point as close as possible to the flowing plastic material that passes through passageway 38 of extrusion die 18. Each of heating elements 53 and temperature sensors 54 is connected with control unit 30, the sensors serving to provide as input to the control unit the temperature values corresponding with the respective sectors, and the heating elements being controlled by the control unit as hereinafter described.

The present method is directed to controlling the wall thickness of the extruded pipe, both from an overall average standpoint, as well as the thickness at individual points distributed along the circumference of the pipe cross-section. In carrying out the method, the thickness of the pipe is measured by the wall thickness measuring device 22 at a point downstream of extrusion die 18 and cooling chamber 20, and upstream of haul-off 24. The thickness measurement is performed at several points around the periphery of the pipe, and, if desired, the thickness measurements can include a complete and continuous thickness profile around the entire periphery, or it can include thickness measurements at only selected points about the periphery.

In the apparatus embodiment hereinbefore described, extrusion die 18 includes eight individual sectors 50 in which the temperature is set and controlled. Therefore, if desired, the thickness measurements can be made at eight corresponding equally distributed positions about the periphery of the pipe. Alternatively, a much larger number of thickness measurements can be performed within each pipe sector, and they can be averaged to provide an average sector thickness value. In any event, an overall average pipe wall thickness is calculated based upon the individual thickness measurements, and that calculated average thickness value is compared with a desired average wall thickness, which can be defined in terms of a range of average wall thicknesses, and if the calculated average wall thickness is above the desired average value, or if it is higher than the upper limit of the desired range, if a range is provided, the haul-off speed is increased by speed control 31 until the calculated average thickness is reduced to the desired level. Similarly, if the calculated average wall thickness is less than the desired value, or is lower than the lower limit of the desired range, the haul-off speed is reduced by speed control 31 until the calculated average wall thickness corresponds with the desired average wall thickness, or until it is within the desired range of wall thicknesses.

After the calculated average thickness has been determined to be at or within the desired levels, the individual wall thicknesses for each particular sector, or, alternatively, an average of the thicknesses for each particular sector in the event multiple thickness measurements are taken in a given sector, are compared with the calculated average thickness to determine the amount of eccentricity. Based upon the amount of eccentricity, and the locations of the eccentricity about the pipe circumference, corrections are made to the heating elements that are positioned in the respective sectors in order to change the extrusion die surface temperatures within those sectors, and in a direction to provide the desired thickness distribution. In that connection, the most common objective is to provide a pipe having a uniform thickness distribution in order to permit the resulting pipe to conform with the applicable material specification, depending upon its end use, while minimizing the amount of excess material and thereby reducing the weight and cost of the pipe. However, if a particular application for a pipe requires that there be a non-uniform thickness distribution around the pipe circumference, the present invention permits such a non-uniform distribution to be obtained and controlled as well.

The control of wall thickness by means of the control of sector temperature is based upon the fact that the temperature at the surface of the extrusion die influences the sliding friction between the die surface and the flowing melted polymeric material. When the friction force changes, as a result of the change of the die surface temperature, the rate at which the melt material flows is changed as well. Thus the flow volume per unit time, which influences the wall thickness, changes, and if the temperature at the extrusion die surface is increased, which results in a reduction of the friction between the die surface and the flowing melterd material, the volume of flow at that area is increased and as a result the wall thickness at that particular sector also increases. Because the total flow volume is maintained constant, the increase in thickness of the pipe wall at one particular sector causes a reduction of the flow volume at other sectors, which effects the respective pipe wall thicknesses at those other sectors. Therefore, the circumferential control of temperature distribution results in control of the circumferential distribution of pipe wall thickness.

Additionally, the change in temperature of the flowing material influences the viscosity, and therefore an increase in temperature results in a decrease in the viscosity, to permit a higher flow rate at a particular sector and, correspondingly, a reduced temperature results in a higher viscosity, resulting in a reduced flow rate at a particular sector.

Figure 5:
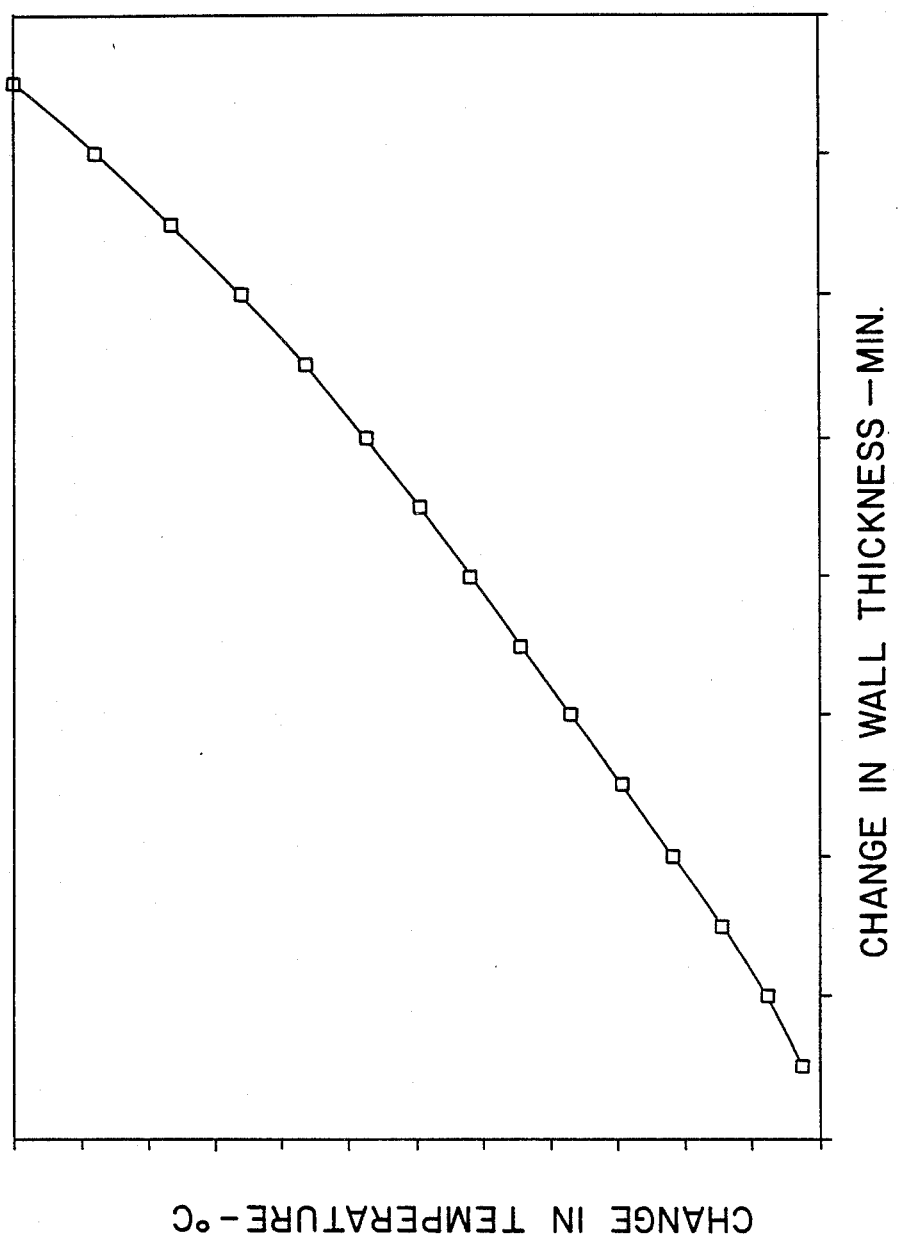
FIG. 5 is a characteristic curve or for a particular polymeric material showing the variation of wall thickness of an extruded article as a function of the variation of extrusion die temperature.

Because the flow characteristics of a specific material can be defined as a function of temperature, it is possible to accurately control the amount of temperature change needed to effect a particular wall thickness change. In that connection, the thickness versus temperature characteristic for a specific material can be experimentally determined, and the results can be plotted as a curve of temperature change versus wall thickness change, an example of which is illustrated in FIG. 5. Consequently, by knowing the amount of change necessary in wall thickness to achieve a desired wall thickness at a particular sector, that thickness change can be found on the curve and the curve can be read to determine the necessary temperature change to effect the desired wall thickness change. The resulting curve, which can be referred to as a "characteristic curve" for the particular material, can be reduced to a mathematical equation, if desired, or, alternatively, a series of discrete temperature and thickness data points can be loaded into the control unit as data points to permit the temperature control information to be obtained either directly or by interpolation, depending upon the number of data points serving as input. Of course, the characteristic curve should be determined individually for each specific material that is extruded. In that regard, the most common material from which extruded plastic pipe is made is polyvinyl chloride (PVC) although pipes can also be made from high density polyethylene, polypropylene, acrylonitrile butadiene styrene (ABS), and the like.

Figure 6:
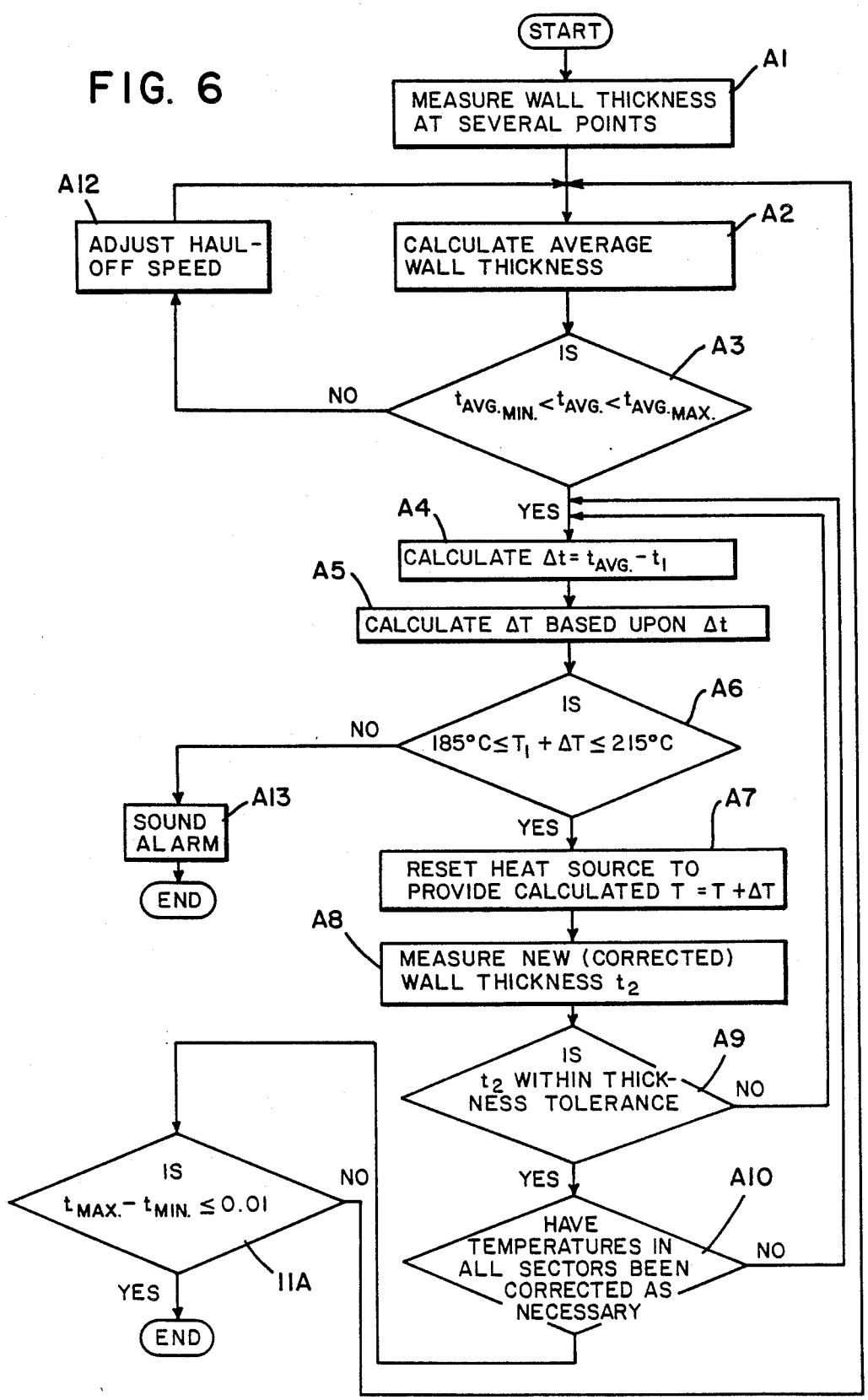
FIG. 6 is a flow chart showing the overall operation of the extrusion method in accordance with the present invention.

Referring now to FIG. 6, there is shown a flow chart identifying several of the principal steps involved in carrying out the method in accordance with the present invention. At the outset, the extrusion line illustrated in FIG. 1 is started up and when substantially uniform conditions have been reached the wall thickness is measured at several circumferentially spaced points around the periphery of the pipe, such as by using an ultrasonic thickness measurement device as hereinbefore generally described. From those measurements, which are shown as step A1, the next step A2 involves the calculation of the overall average wall thickness for the entire pipe circumference. In step A3, the overall average thickness is compared with a desired range of overall thicknesses, defined as a maximum and a minimum, and a determination is made whether the average of the measured wall thicknesses is within the desired range of wall thickness. If the average of the measured thicknesses is not within the desired range, the method involves the performance in step A12 of an adjustment in the haul-off speed, either to increase or to decrease that speed, in order to provide the desired overall average wall thickness.

Once the desired average thickness is obtained, step A4 involves the calculation of the difference in average wall thickness at a particular sector and the overall average thickness. That difference is indicative of the direction and amount of change of extruder die sector temperature that would be required to make any necessary correction in the wall thickness at that particular sector. After the difference in average sector wall thickness and overall average wall thickness is determined in step A4, the next step, A5, involves the calculation of the necessary temperature change that must be made at that particular sector in order to have the wall thickness at that sector coincide with the desired average wall thickness. That step can involve the reading of a characteristic curve, such as that shown in FIG. 5, that is input into the control unit in any convenient form. As will appreciated by those skilled in the art, the characteristic curve can be determined by fitting a curve mathematically to a series of experimental data points in the form of an equation based upon the variation of temperature with the variation of wall thickness for the particular material being extruded.

A determination is then made in step A6 whether the temperature that would result after any necessary temperature correction that is calculated for a particular sector, represented by the term $T_1 + \Delta T$, is within the range of 185° C. and 230° C. $T_1$ represents the extrusion die temperature before a correction is made. If the resulting temperature that is calculated to be required is not within that range of temperature limits, then an alarm is sounded to require operator attention. Under those circumstances, some physical correction must be made to the relative position of inner mandrel 36 with respect to outer sleeve 34 of the extrusion die, because the eccentricity between those two elements is therefore excessive, and correction of eccentricity would require excessive temperature changes in order to attempt to bring the wall thickness within the desired range.

The selection of the temperature limits for step A6 is based upon the material that is being extruded, and those temperature limits identified above apply for PVC. The temperature limits are determined by the quality requirements of the resulting product, as well as by the thermal loading capacity of the material. Below the lower temperature (185° C.) the pipe surface is of a low and unacceptable quality, and consequently the temperautre of the extruded material should not fall below that value in order to obtain acceptable production. Temperatures above the upper limit (215° C.) could cause localized burning of the extruded material, which, again, would result in an unacceptable extruded product.

If the corrected temperature as determined in step A6 is within the defined temperature range, then the control unit provides a signal to the heat source in that sector (step A7) to reset the temperature in that particular sector to correspond with the temperature that had been determined in step A6 as a result of using the characteristic curve to provide the desired wall thickness. The new or corrected wall thickness that results is then measured in step A8, after the temperature correction has been effected, and if that new wall thickness is not within the thickness tolerance, as determined in step A9, then the procedure set forth in steps A4 through A9 is repeated. The remaining sectors, which as hereinbefore described are seven in number, can then be similarly monitored and set to provide the desired wall thickness.

In step A10 a determination is made whether the temperatures in all sectors have been corrected as necessary to provide the desired thickness distribution, and if not, the loop is repeated through steps A4 through A10 until the corrections have all been made. Thereafter, step A11 involves the determination of the difference between the maximum wall thickness and the minimum wall thickness after all sector corrections have been made, to determine whether that difference is equal to or less than a predetermined set difference value, which in this particular case has been chosen to be 0.01 mm. If the difference is less than the predetermined value, the correction process terinates and the wall thicknesses are thereafter merely monitored. However, if the difference between the maximum and minimum wall thicknesses is greater than the predetermined difference value, then the method returns to step A2 to repeat the process until the wall thickness difference is at or below the predetermined difference value.

The adjustment of the sector wall thickness can also be effected step-wise, in accordance with predetermined wall thickness correction increments, until the deviation of the sector wall thickness does not exceed a predetermined maximum wall thickness deviation. A nominal value of wall thickness can be determined by averaging a plurality of sector wall thickness values.

Thus, it can be seen that the present method provides a rapid and accurate method of automatically setting the wall thickness distribution in an extruded article to correspond with a predetermined desired thickness distribution, and to do so in such a way as to minimize the amount of excessive material, in order thereby to provide the lowest cost product. In that regard, in the prior art processes in which the thickness was monitored merely to insure that the thickness at any point did not fall below a minimum value, it was entirely possible that at other points on the pipe circumference the thickness was considerably greater than was necessary, which resulted in a waste of material. The present invention overcomes that deficiency, and it has been found that the present method permits the maintenance of extrusion die temperature within a fluctuation range of plus or minus 0.5 C., with a resulting wall thickness variation of approximately 0.25%.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for monitoring and controlling the wall thickness of an extruded profile of heated polymeric material that issues from an extrusion die, the die including a plurality of discrete sectors each having a temperature controllable heat source and a temperature sensing device, said method comprising the following steps:
   (a) extruding a polymeric material in an extrusion direction through an extrusion die at an extrusion speed to provide an article of predetermined cross-sectional shape from the extrusion die, the article having a periphery and a wall thickness dimension and having a longitudinal axis extending in the extrusion direction;
   (b) measuring the wall thickness of the extruded article at a plurality of spaced measuring points on the periphery of the article, each of the measuring points spaced laterally outwardly of the longitudinal axis of the article, and calculating the overall average wall thickness of the extruded article from the measured wall thicknesses;
   (c) providing a predetermined desired average wall thickness, a predeterined wall thickness distribution, and a predetermined wall thickness tolerance;
   (d) providing data means indicative of a change in wall thickness of the article as a function of a change in the temperature of the extrusion die to permit a determination of a temperature change that is necessary to effect a desired wall thickness change;
   (e) determining from the wall thickness measurements the maximum wall thickness value, the position on the article corresponding with the maximum wall thickness value, the minimum wall thickness value, and the position on the article corresponding with the minimum wall thickness value;
   (f) determining from the data means the temperature change required at each sector of the die to change the measured wall thickness to correspond substantially with the calculated overall average wall thickness; and
   (g) changing the temperatures of the respective heat sources at the respective extrusion die sectors to provide the desired die sector temperatures and the desired article wall thicknesses at corresponding points on the extruded article.

2. A method in accordance with claim 1, including the step of comparing the calculated overall average wall thickness with a desired overall average wall thickness and adjusting extrusion speed as necessary to cause the calculated overall average wall thickness to coincide substantially with the desired overall average wall thickness.

3. A method in accordance with claim 1, including the steps of:
   (a) providing a range of desired maximum wall thickness difference between a maximum measured wall thickness and a minimum measured wall thickness after the temperatures at the respective heat sources have been changed;
   (b) determining the difference between the measured maximum wall thickness and the measured minimum wall thickness to provide a measured maximum wall thickness difference;
   (c) comparing the measured maximum wall thickness difference with the desired maximum wall thickness difference; and
   (d) repeating steps (b) through (g) as set forth in claim 1 as necessary until the measured maximum wall thickness difference is within the desired maximum wall thickness difference range.

4. A method in accordance with claim 1, including the following additional steps:
   (a) providing a predetermined range of upper and lower extrusion die temperature limit values;
   (b) adding the extrusion die temperature corresponding with a given extrusion die sector and a change in temperature determined from the data means as necessary to obtain a desired change in wall thickness at that sector to provide an adjusted sector die temperature.
   (c) comparing the adjusted sector die temperature with the predetermined upper and lower extrusion die temperature limit values; and (d) providing an alarm signal of the adjusted sector die temperature is outside the predetermined upper and lower extrusion die temperature limit values.

5. A method in accordance with claim 1, including the step of changing the overall average wall thickness by changing the speed of operation of a haul-off apparatus that engages the extruded article and pulls it away from the extrusion die.

6. A method in accordance with claim 1, wherein the extruded profile is a tubular pipe of circular cross section and the desired wall thickness distribution is a uniform wall thickness distribution throughout the entire pipe cross section.

7. A method in accordance with claim 1, wherein the extruded profile is a tubular pipe of circular cross section, and the desired wall thickness distribution is a non-uniform wall thickness distribution.

8. A method in accordance with claim 1, including the following additional steps:
   (a) providing a maximum wall thickness deviation from a nominal value;
   (b) measuring the wall thickness at a plurality of transversely spaced points about the periphery of the extruded profile;
   (c) determining the difference between the measured wall thickness at a given sector and the nominal value to provide a sector wall thickness deviation; and
   (d) adjusting the extrusion die sector temperature if the sector wall thickness deviation is greater than the maximum wall thickness deviation, to provide a desired wall thickness profile at the given sector.

9. A method in accordance with claim 8, wherein the extrusion die sector temperature adjustment is calculated based upon the data means relationship of wall thickness change as a function of temperature change.

10. A method in accordance with claim 8, wherein the nominal value is an average wall thickness value determined by averaging a plurality of sector wall thickness values.

11. A method in accordance with claim 8, wherein the sector wall thickness is adjusted step-wise in accordance with predetermined wall thickness correction increments until the wall thickness deviation does not exceed the maximum wall thickness deviation.

* * * * *